(12) United States Patent
Bhargava et al.

(10) Patent No.: US 9,724,619 B2
(45) Date of Patent: Aug. 8, 2017

(54) SEPARATION PROCESSES USING DIVIDED COLUMNS

(71) Applicant: GTC Technology US LLC, Houston, TX (US)

(72) Inventors: Manish Bhargava, Katy, TX (US); Cole Nelson, Cypress, TX (US)

(73) Assignee: GTC Technology US LLC, Houston, TX (US)

( * ) Notice: Subject to any disclaimer, the term of this patent is extended or adjusted under 35 U.S.C. 154(b) by 263 days.

(21) Appl. No.: 13/830,299

(22) Filed: Mar. 14, 2013

(65) Prior Publication Data

US 2014/0231238 A1    Aug. 21, 2014

Related U.S. Application Data

(60) Provisional application No. 61/767,434, filed on Feb. 21, 2013.

(51) Int. Cl.
| | |
|---|---|
| B01D 3/00 | (2006.01) |
| B01D 3/14 | (2006.01) |
| B01D 11/00 | (2006.01) |
| C07C 29/76 | (2006.01) |
| B01D 3/32 | (2006.01) |

(52) U.S. Cl.
CPC ............. B01D 3/141 (2013.01); B01D 3/322 (2013.01)

(58) Field of Classification Search
CPC ......... C07C 263/20; C07C 7/04; B01D 3/141; B01D 3/322; B01D 3/4255
See application file for complete search history.

(56) References Cited

U.S. PATENT DOCUMENTS

| | | | | |
|---|---|---|---|---|
| 2,528,892 A | * | 11/1950 | Lien et al. | 585/800 |
| 3,725,211 A | * | 4/1973 | Gehrken | 203/74 |
| 4,569,827 A | * | 2/1986 | Wright et al. | 422/610 |
| 4,778,566 A | * | 10/1988 | Vinz | 202/153 |
| 4,824,527 A | * | 4/1989 | Erickson | 203/25 |
| 4,857,157 A | * | 8/1989 | Sulmont | C25C 3/20 204/225 |
| 5,346,593 A | * | 9/1994 | Cialkowski et al. | 203/18 |
| 5,453,559 A | * | 9/1995 | Phillips et al. | 585/809 |
| 5,709,780 A | | 1/1998 | Ognisty et al. | |
| 5,865,957 A | * | 2/1999 | Ueda | B01D 3/00 203/25 |
| 6,395,950 B1 | * | 5/2002 | Rice | B01D 3/141 585/734 |

(Continued)

FOREIGN PATENT DOCUMENTS

| | | | | |
|---|---|---|---|---|
| CN | 102190559 | * | 9/2011 | ............... B01D 3/14 |
| CN | 102190559 A | | 9/2011 | |

(Continued)

*Primary Examiner* — Ana Fortuna
(74) *Attorney, Agent, or Firm* — Winstead PC

(57) ABSTRACT

The claimed invention provides a technique wherein the two column system is combined into a single column. The light components are concentrated on the prefractionation side (feed side) of the column, where they are removed as an overhead top product. The middle boiling components are removed as an overhead product on the opposite side of dividing wall. For the same product specifications, top divided column requires substantially lower capital and operating cost than a conventional two-column system.

10 Claims, 3 Drawing Sheets

(56) References Cited

U.S. PATENT DOCUMENTS

| | | | |
|---|---|---|---|
| 6,472,578 B1 | 10/2002 | Rice | |
| 6,479,720 B1* | 11/2002 | O'Brien et al. | 585/448 |
| 6,568,208 B1 | 5/2003 | Fidkowski et al. | |
| 6,803,483 B2* | 10/2004 | Lokum et al. | 560/347 |
| 6,846,389 B2* | 1/2005 | Kaibel et al. | 203/1 |
| 7,118,653 B2* | 10/2006 | Brady et al. | 203/29 |
| 7,267,746 B1* | 9/2007 | Harris et al. | 202/160 |
| 7,897,829 B2* | 3/2011 | Glover et al. | 585/827 |
| 8,197,677 B2 | 6/2012 | Schultz et al. | |
| 8,323,457 B2* | 12/2012 | Townsend | B01D 3/007 202/153 |
| 8,901,346 B2* | 12/2014 | Merenov et al. | 560/352 |
| 2005/0199482 A1 | 9/2005 | Heida | |
| 2007/0293688 A1* | 12/2007 | Siegert | B01D 3/141 549/368 |
| 2011/0167868 A1 | 7/2011 | Pierce et al. | |
| 2011/0308930 A1 | 12/2011 | Lee et al. | |
| 2017/0044081 A1* | 2/2017 | Kim | C07B 63/00 |

FOREIGN PATENT DOCUMENTS

| | | | | |
|---|---|---|---|---|
| CN | 102190559 A | | 9/2011 | B01D 3/14 |
| FR | 2776206 | * | 3/1998 | B01D 3/32 |

* cited by examiner

SEPARATION PROCESSES USING DIVIDED COLUMNS

CROSS-REFERENCES TO RELATED APPLICATIONS

This Application claims the benefit under 35 U.S.C. §119(e) of U.S. Provisional Patent Application Ser. No. 61/767,434 filed Feb. 21, 2013, which is incorporated herein by reference in its entirety as if fully set forth herein.

FIELD OF THE INVENTION

The claimed invention (Top Dividing Wall Column Depropanizer or TDWC) provides an innovative technique wherein the two column system is combined into a single column. The light components are concentrated on the prefractionation side (feed side) of the column, where they are removed as an overhead top product. The middle boiling components are removed as an overhead product on the opposite side of dividing wall. For the same product specifications, TDWC requires substantially lower capital and operating cost than a conventional two-column system.

BACKGROUND OF THE INVENTION

Distillation and absorption are very common separation techniques used in the process industries. Both techniques require a large amount of energy due to the heating and cooling involved in the process. These techniques were mostly designed more than a decade ago when the economic, political and societal scenarios were different. It would be desirable to reduce the energy cost in the interest of economy as well as society.

There are complex separation configurations available that offer substantial reduction in energy and capital expenditures. These options include dividing wall columns. Dividing wall columns are normally used in distillation processes. FIG. 1 represents the prior art. The column operates at 390 psig with an overhead temperature of 95° F. This conventional depropanizer aims at separating $C_2/C_3$ components as an overhead product and $C_4/C_{4+}$ components as the bottoms product of the column.

However, the prior art possesses several disadvantages. It is not possible to condense the lighter components in the overhead product at 350 psig and using cooling water as the overhead cooling media. The overhead system has a partial condenser. $C_2$ and lighter components (used as fuel gas) are drawn as the vapor product from the partial condenser. $C_3$ product is the liquid stream from the partial condenser. A considerable amount of $C_3$ components are lost to the fuel gas vapor stream. The loss of $C_3$ components can be prevented by decreasing the overhead temperature (e.g., by using refrigeration) or increasing the column pressure. However, this increases the operating cost of the column. Although the prior art systems offers a sharp split between $C_3$ and $C_{3+}$, the recoveries of these components is low as they are lost in the fuel gas vapor stream.

FIG. 2 represents alternative prior art. This process uses a two column design. The first column is a reboiled absorber which aims at separating non-condensed products from the feed. The non condensables (used as fuel gas) are the overhead vapor product from this column. The bottoms from the first column are fed to the second column. The second column. $C_3$ product is withdrawn as an overhead product in the second column and $C_4/C_{4+}$ is withdrawn as the bottoms product. Although, this prior art system offers high $C_3/C_{3+}$ recoveries. The disadvantage is higher capital expenditure and higher energy consumption.

Thus, it would be desirable to have a system that overcomes the disadvantages of the prior art systems.

SUMMARY OF THE INVENTION

An embodiment of the invention is directed to a process wherein two different unit operations (absorption and distillation) take place on either side of a top dividing wall column. In an embodiment of the invention, the top divided column is used as a depropanizer that recovers $C_3$ components from fuel gas.

DETAILED DESCRIPTION OF EXEMPLARY EMBODIMENTS

An embodiment of the invention is directed to a process wherein two different unit operations (absorption and distillation) take place on either side of a top dividing wall column.

The innovation is explained through an example, a conventional depropanizing system The claimed invention provides an innovative technique wherein a two column system used in a distillation set up is combined into a single column. In certain embodiments of the invention, the light components are concentrated on the prefractionation side (feed side) of the column, where they are removed as an overhead top product. The middle boiling components are removed as an overhead product on the opposite side of dividing wall. Thus, for the same product specifications, the top divided wall column of the claimed invention requires substantially lower capital and operating cost than a conventional two-column system.

Figure 1:
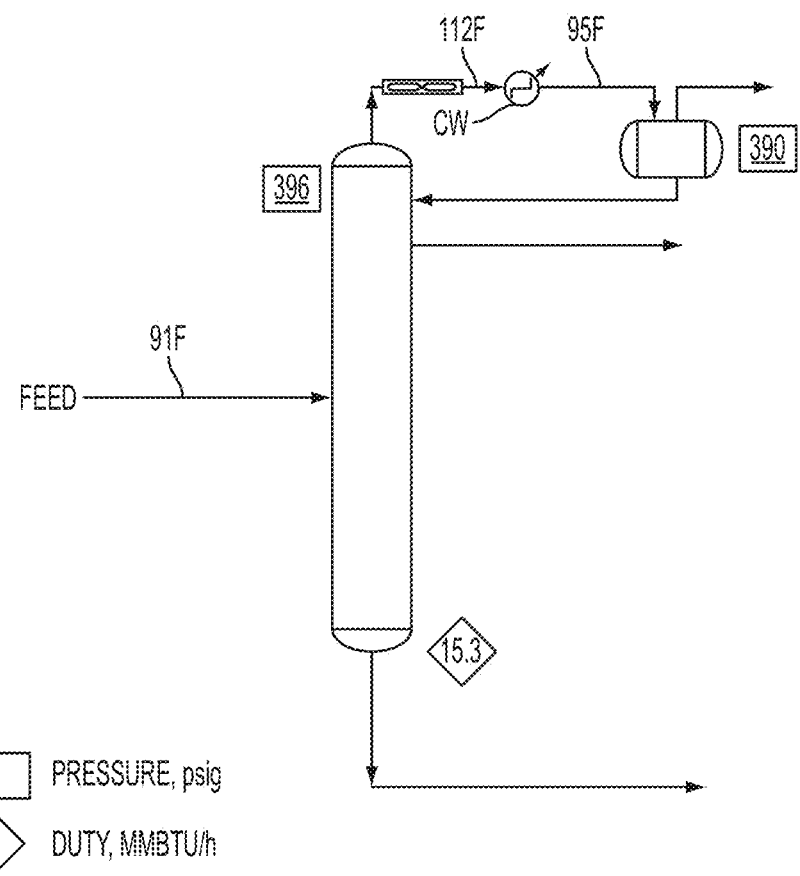
FIG. 1 represents a prior art separation process in accordance with an embodiment of the invention.
Figure 2:
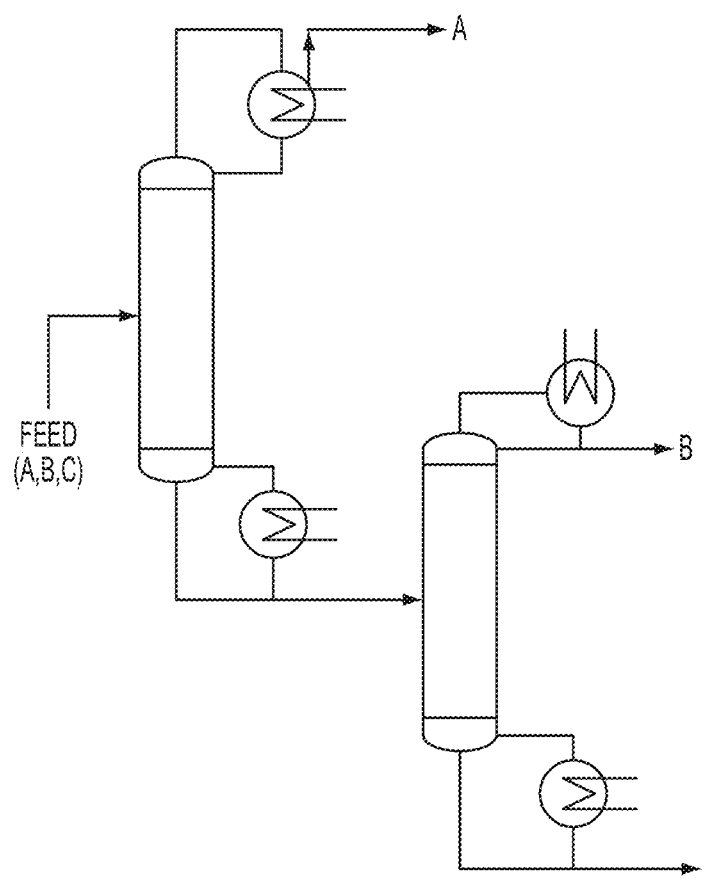
FIG. 2 represents a dual column separation process in accordance with an embodiment of the invention.
Figure 3:
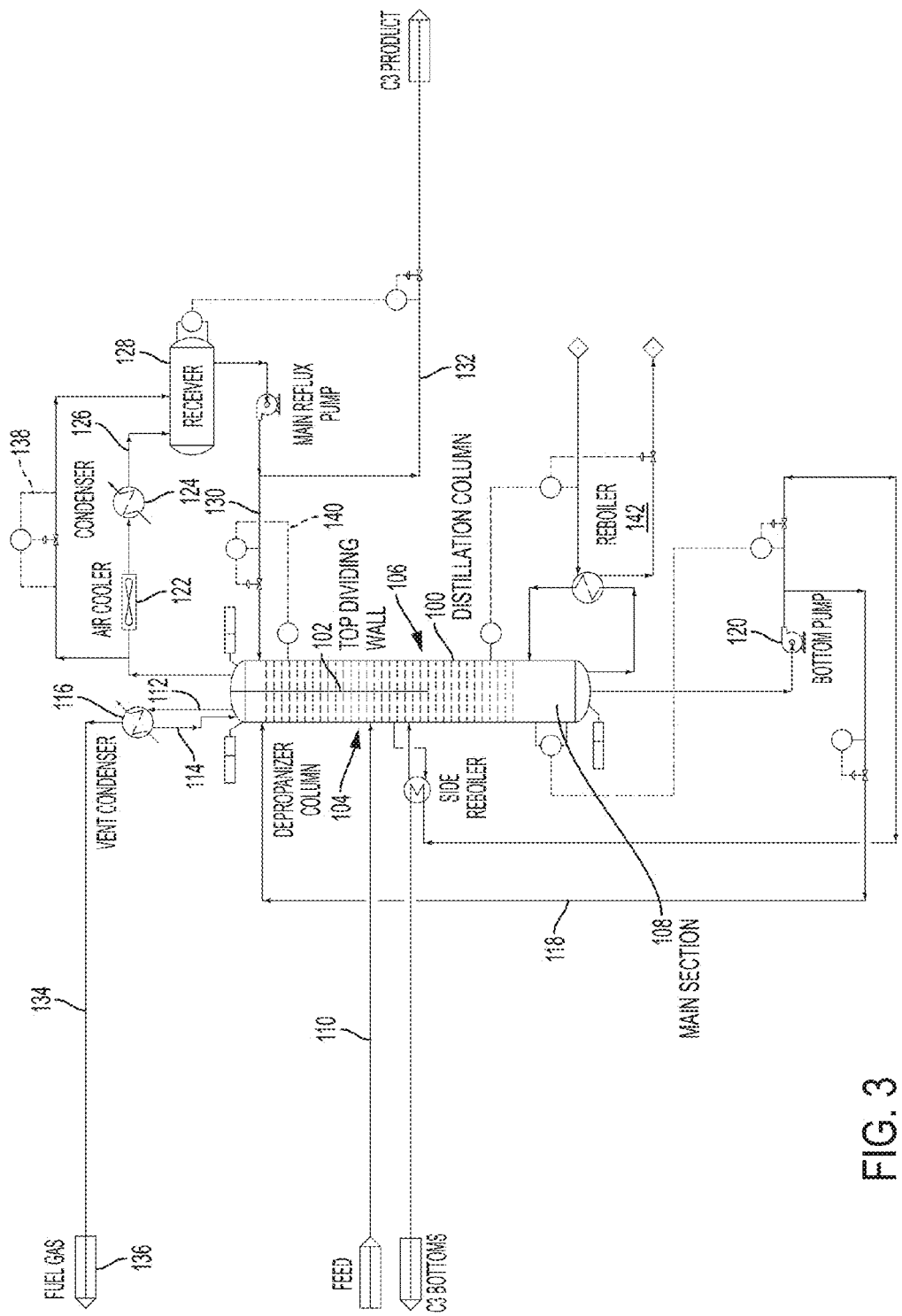
FIG. 3 represents a process scheme in accordance with an embodiment of the invention.

A working representation of the claimed invention is set forth in FIG. 3. A distillation column 100 having a top dividing wall 102 is shown. The top divided column 100 has a first or feed side 104 that is located on one side of the dividing wall 102 and a second or product side 106 on the opposite side of the dividing wall 102. The feed side 104 may also be referred to as a prefractionation side 104. The bottom portion of the top divided column i.e., the opposite side of the top divided column, may be referred to as a main section 108.

In an embodiment of the invention, the process scheme of the claimed invention is designed to separate $C_2$ (Non condensables), $C_3$ (intermediate component), $C_{3+}$ (Heavies) in a single top divided column 100. A feed stream 110 is first sent to the pre-fractionation side 104 of the top divided column 100. The vertical dividing wall 102 splits the top portion of the column 100 into two halves. The feed side 104 of the wall is called the pre-fractionation section. Non-condensables (used as fuel gas) are removed as overhead vapor product from a vent condenser 116. In certain embodiments of the invention, a column overhead pressure is set at 350 psig via a pressure controller on the overhead fuel gas product line 112. The section above the feed 110 acts as an absorption section that is primarily used to minimize a loss of $C_3$ components. The pre-fractionation side 104 has reflux coming from two sources: A liquid stream 114 condensed from the vent condenser 116; and a heavy stream 118 from a bottoms pump 120.

In an embodiment of the invention, vapor from the overhead of the product side 106 is condensed and cooled to 95° F. in an air-cooled exchanger 122 followed by the water-cooled condenser 124. An output line 126 from an outlet of the water-cooled condenser 124 is collected in an overhead receiver 128. $C_3$ light liquid is pumped out of the overhead receiver 128 via reflux pumps. A portion of the $C_3$ light liquid is sent back to the top divided column 100 as reflux via line 130 and the remainder is withdrawn as $C_3$ product via line 132.

In an embodiment of the invention, an operating pressure of the top divided column 100 is controlled by a pressure control loop installed on the non-condensable line 134 going to a fuel gas header 136, while the pressure in the overhead receiver 128 is controlled by a hot by-pass pressure control loop 138.

In an embodiment of the invention, a temperature in a top section of the product section 106 is controlled in cascade with the reflux flow control loop 140. This allows control over the quality of the $C_3$ product by suppressing the tendency of the heavier components from going to the top of the column.

In an embodiment of the invention, a reboiler 142 connected to the main section 108 is a thermosyphon steam reboiler that uses steam as heating medium. Heat input to the reboiler 142 is regulated by controlling the steam flow cascaded to the column bottom tray temperature controller.

The $C_3$ bottom product is controlled by a level control loop in cascade with the bottom product flow rate.

Overall aspects of the invention relate to methods for increasing the energy efficiency of a distillation process using a top divided column. Those having skill in the art, with the knowledge gained from the present disclosure, will recognize that various changes could be made to the methods disclosed herein without departing from the scope of the present invention. Mechanisms used to explain theoretical or observed phenomena or results, shall be interpreted as illustrative only and not limiting in any way the scope of the appended claims.

What is claimed is:

1. A distillation column comprising:
   a column comprising a vertical dividing wall in a top section of the column, the vertical dividing wall dividing the top section of the column into a first side and a second side;
   a feed inlet conduit for directing a feed to the first side of the column;
   a first condenser connected with the first side of the column;
   a second condenser connected with the second side of the column;
   a reboiler in fluid communication with a bottom section of the column; and
   a pump in fluid communication with the bottom section of the column for removing a fluid portion from the bottom and direct the fluid portion to the top section of the first side of the column.

2. The distillation column of claim 1, wherein the first condenser is a partial condenser and the second condenser is a total condenser.

3. The distillation column of claim 1, wherein the feed conduit directs a fuel gas containing C3 components to the distillation column, and wherein the bottom section of the column recovers C3 components from fuel gas.

4. The distillation column of claim 3 wherein the feed side acts as a reboiled absorber, which separates non-condensables from $C_3$.

5. The distillation column of claim 1, wherein the first side is a prefractionation side, and the second side is a product side.

6. The distillation column of claim 5 wherein the prefractionation side contains an absorption solvent.

7. The distillation column of claim 6 wherein a portion of the absorption solvent is sent back to the column as reflux and the remainder is withdrawn as $C_3$ product that is separated from a feed containing fuel gas and C3 components.

8. The distillation column of claim 7 wherein the reflux helps reduce loss of $C_3$ to fuel gas.

9. The distillation column of claim 1 wherein a side reboiler is connected to a first side of said distillation column.

10. The distillation column of claim 9 wherein a heating medium of the reboiler comprises column bottoms.

\* \* \* \* \*